United States Patent [19]

Heidolph et al.

[11] Patent Number: 4,966,782

[45] Date of Patent: Oct. 30, 1990

[54] CHEMICAL LEAVENING SYSTEM

[75] Inventors: Barbara B. Heidolph, Wentzville; Frank P. Jakse, Florissant, both of Mo.

[73] Assignee: Monsanto Company, St. Louis, Mo.

[21] Appl. No.: 466,159

[22] Filed: Jan. 17, 1990

Related U.S. Application Data

[63] Continuation of Ser. No. 249,938, Sep. 27, 1988, abandoned.

[51] Int. Cl.$^5$ ................................................. A23L 1/10
[52] U.S. Cl. ..................................... 426/551; 426/552; 426/561; 426/562; 426/563
[58] Field of Search ................. 426/551, 561, 94, 562, 426/563, 552

[56]  References Cited

U.S. PATENT DOCUMENTS

| | | | |
|---|---|---|---|
| 108,097 | 10/1870 | Boss et al. | 426/551 |
| 315,831 | 4/1885 | Peters | 426/563 |
| 328,364 | 10/1885 | Underwood | 426/562 |
| 331,541 | 12/1885 | Peters | 426/562 |
| 331,542 | 12/1885 | Peters | 426/563 |
| B 389,605 | 3/1976 | Stahl | 426/561 |
| 3,034,899 | 5/1962 | Tucker | 426/653 |
| 3,041,177 | 6/1962 | Lauck et al. | 426/563 |
| 3,109,738 | 11/1963 | Tucker | 426/561 |
| 3,595,671 | 11/1970 | Cooke et al. | 426/23 |
| 4,186,215 | 1/1980 | Buchel | 426/561 |
| 4,237,147 | 12/1980 | Merten et al. | 426/590 |
| 4,388,336 | 6/1983 | Yong et al. | 426/551 |

OTHER PUBLICATIONS

"Carbonation of Ca(OH)$_2$ Investigated by Thermal and X-Ray Diffraction Methods of Analysis" *J. Appl. Chem.*, vol. 17, 1967, Jul, pp. 185–189.

*Primary Examiner*—Donald E. Czaja
*Assistant Examiner*—D. Workman
*Attorney, Agent, or Firm*—R. C. Loyer

[57] ABSTRACT

There is disclosed novel leavening systems, doughs and baked goods which employ stabilized x-ray amorphous calcium carbonate as the carbonate factor in combination with suitable leavening acids. Also disclosed are sodium-free leavening systems providing equivalent performance of previously known sodium containing leavening systems.

9 Claims, No Drawings

CHEMICAL LEAVENING SYSTEM

This is a continuation of Application Ser. No. 07/249,938, filed Sept. 27, 1988, abandoned.

This invention relates to chemical leavening systems for baked goods and more particularly to chemical leavening systems, baking powders, fresh dough and baked goods therefrom wherein the chemical leavening system contains stabilized x-ray amorphous calcium carbonate (SACC) as the source of carbon dioxide (carbonate factor) and a suitable leavening acid.

Chemical leavening systems have been known for over 100 years. The replacement of yeast to induce the process of fermentation by a carbonate alkali which is subjected to the neutralizing action of an acid has reduced the amount of time and materials required for the preparation of baked goods. From this early beginning various leavening systems have been invented and sold as baking powders which contain not only the leavening alkali and the acid employed to neutralize the acid, but also fillers which enabled convenient measurement, handling and storage of such baking powders.

Leavening systems have long been known to comprise two basic ingredients. The first, of course, is the leavening acid such as cream-of-tartar, various phosphoric acids such as orthophosphoric acid, pyrophosphoric acid and the partial salts thereof such as monocalcium phosphate, sodium acid pyrophosphate, and any other suitable, edible, non-toxic acid which would not impart an undesirable taste to the resultant baked goods. Such acids have been known as "acidulants", or "baking acids" but more commonly as "leavening acids".

When added to a moist batter or dough, the acid reacts with a carbon dioxide liberating compound included in the batter or dough to yield the gas necessary for leavening. The rate of gas evolution is an important consideration determining largely the volume, density and texture qualities which will be imparted to the final baked product. This rate must occur within rather narrow limits for some applications such as in the preparation of prepared, canned dough for biscuits. Also, leavening requirements differ widely among the various baked goods for each of these demands a particular speed of evolution to ensure highest quality products. One of the principal factors with respect to the speed of evolution of carbon dioxide is the reactivity of the carbon dioxide producing material.

It has been known to regulate the speed of carbon dioxide evolution by control of the reactivity of the leavening acid. Numerous attempts to control the speed of reaction of the leavening acid are known in the art. Typical examples include U.S. Pat. No. 3,034,899 to Tucker wherein a finely divided calcium salt is combined with the acid to control the speed of reaction.

Calcium salts have been employed in chemical leavening systems from its earliest days. A typical example of such use is found in U.S. Pat. No. 315,831 to Peters. However, such calcium salts as taught in Peters are relatively slow acting and have not provided satisfactory performance as the carbonate factor particularly in comparison with the alkali metal salts. Although calcium salts such as calcium carbonate have been employed for various purposes such as preservatives for the leavening acid, etc. as noted in U.S. Pat. Nos. 4,388,336 and 4,526,801, such carbonates do not provide the reactivity desired for a carbonate factor in baked goods.

Various forms of x-ray amorphous calcium carbonate have been previously observed. One early report of such a material is provided by J. E. Gillott in the *Journal of Applied Chemistry*, 1967, Volume 17, pp. 185–189 in an article entitled "Carbonation of $Ca(OH_2)$ Investigated by Thermal and X-Ray Difraction Methods of Analysis". This publication was specifically directed to the art of preparing Portland Cement. Although an amorphous calcium carbonate is reported, such product was also reported to easily crystallize upon heating or even at room temperature in the presence of moisture.

SUMMARY OF THE INVENTION

In one aspect of this invention there has been discovered a chemical leavening system for baked goods comprising stabilized, x-ray amorphous calcium carbonate (SACC) as the carbonate factor in combination with a leavening acid.

In another aspect of this invention, a novel, sodium-free, chemical leavening system for baked goods has been discovered comprising SACC as the carbonate factor and a leavening acid free of sodium.

In another aspect of this invention, there has been discovered a baking powder comprising SACC as the carbonate factor, a leavening acid, fillers and preservatives.

In yet another aspect of this invention there is provided a fresh dough product comprising a chemical leavening system comprising a leavening acid and SACC as the carbonate factor.

In another and very important aspect of this invention a fresh dough product is provided containing reduced amounts of sodium.

DETAILED DESCRIPTION OF THE INVENTION

SACC discovered by H. L. Merten et al and disclosed in U.S. Pat. No. 4,237,147 has been found to be useful as a carbonate factor in leavening systems. Said patent is hereby incorporated herein by reference. The key feature in preparing SACC was found to be low temperature carbonation and reducing the amount of chemically-bound water contained in the precipitate to below 15% by weight while maintaining the resulting composition in an environment that is essentially free of unbound water. From such a process a stable and therefore useful SACC was provided. The only actual utility taught by Merten et al for SACC was to prepare dry carbonated beverage concentrates for preparing carbonated beverages by admixture with water.

Surprisingly the SACC produced in accordance with the process described in U.S. Pat. No. 4,237,147 provides a useful carbonate factor in chemical leavening systems for baked goods.

Briefly, SACC useful in accordance with this invention is prepared by a process comprising (1) forming an aqueous solution of calcium ions and a hydrogen-bonding material, (2) contacting the solution with carbon dioxide while maintaining the solution at a temperature below about 15° C. to form a precipitate containing chemically-bound water, and (3) reducing the amount of chemically-bound water contained in the precipitate to below about 15% by weight while maintaining the resulting composition in an environment that is essentially free of unbound water. Other details of preparation are contained in the above-mentioned patent to Merten et al which patent is hereby incorporated by reference.

There is provided chemical leavening systems for baked goods in accordance with this invention by combining SACC as the carbonate factor with a suitable leavening acid. Leavening acids useful in accordance with this invention are those leavening acids previously known and include, without limitation, monoammonium dihydrogen phosphate; sodium aluminum phosphate acidic; a mixture of sodium aluminum phosphate acidic with sodium aluminum sulphate anhydrous; a mixture of sodium aluminum phosphate acidic with anhydrous coated monocalcium phosphate; monocalcium phosphate; anhydrous monocalcium phosphate, coated; sodium acid pyrophosphate; citric acid; mixtures of monocalcium phosphate and sodium acid pyrophosphate; mixtures of sodium aluminum sulphate and monocalcium phosphate; monocalcium phosphate, anhydrous; fumaric acid; monocalcium phosphate and sodium aluminum phosphate mixtures; glucono-Δ-lactone; monopotassium tartrate; sodium aluminum sulfate; aluminum sulfate and any other suitable, edible, non-toxic acid.

In an important aspect of this invention there is provided sodium-free chemical leavening systems for baked goods comprising SACC as the carbonate factor and a leavening acid free of sodium. The sodium content of the human diet has been noted to be desirably controlled because of its causal link to high blood pressure. Medical experts estimate that about 20 percent of the U.S. population is genetically predisposed to a form of high blood pressure that is sensitive to sodium in the diet. Much effort has been made to prepare low-sodium foods and even no sodium foods particularly with respect to patients suffering from heart disease and edema. It is therefore a particular advantage of the present invention that chemical leavening systems for baked goods are provided which do not contribute sodium to the human diet by consumption of the resultant baked goods. Accordingly, SACC in combination with sodium-free acids such as, without limitation, citric acid, monocalcium phosphate, fumaric acid, dicalcium phosphate dihydrate and potassium tartrate provide leavening systems, fresh dough products and resulting baked goods having reduced sodium content than can be provided by previous chemical leavening systems containing sodium bicarbonate.

The chemical leavening system of this invention may be incorporated into a baking powder product conveniently prepared by admixing SACC with the leavening acid as a dry powder mix. It is well known that baking powders in the dry powder form are best prepared together with fillers contributing to the bulk of the powder and aiding its measurement for actual use. Fillers such as starch or calcium carbonate are generally employed in baking powders of this invention. Acid pyrophosphates are the preferred leavening acids. Also, monocalcium phosphate in comparatively larger particle size may be employed. The optimum particle size for monocalcium phosphate is in the range of such that not more than 75% of the salt should be less than 100 mesh size. Monocalcium phosphate of smaller particle size provides less stable baking powder and thus shorter shelf life than with larger particle size noted above. Conventional preservatives and fillers may be employed together with the baking powder composition of this invention as is known in the art.

The relative amounts of SACC and at least one leavening acid are generally such so as to provide sufficient generation of carbon dioxide to result in an acceptable final baked product volume and pH. Suitable weight ratios of SACC to at least one leavening acid is in the range of from about 0.39:1 to about 2.05:1, preferably from about 0.952:1 to about 1.19:1 for most baked goods. Relative amounts of these leavening agents which can be used are based upon the powdered ingredients weight and are from about 0.3% to about 12%, preferably from about 1% by weight to about 5% by weight.

Fresh dough can be prepared from the leavening systems of this invention in the conventional manner as has been practiced in the art. Typically the ingredients are mixed together in the dry state and may be stored for conventional time periods. It is preferable to refrigerate dry mixed materials if extended time periods occur between mixing and the preparation of the fresh dough. The dry mix is employed to prepare fresh dough by incorporating suitable liquids such as milk and shortening materials as is known in the art.

As is known in the art, the desired pH of the final baked good can be controlled by incorporating into fresh dough leavening acids and alkaline carbonate sources normally employed for that purpose in the art. Generally, the pH of the final baked product ranges from about 5.5 to about 9.0, preferably from about 6.9 to about 7.5. The amount of alkaline carbonate material added should be sufficient to provide a pH within the above-described ranges. Typically there is included from about 0.3% by weight to about 3% by weight of the edible, alkaline agent, based upon the weight of the powdered ingredients employed.

The typical uses and levels of SACC typically employed therein are provided in the table below. Common commercially available acids in amounts to neutralize may be employed as is known in the art.

| USES AND LEVELS OF USE - SACC | |
| --- | --- |
| PRODUCT | WT. PERCENT |
| Self-Rising Flour | 1.43–1.78 |
| Self-Rising Corn Meal | 1.78–2.38 |
| Biscuit Mixes | 1.78–2.38 |
| Breading Batter Mixes | 0.0–2.38 |
| Cake Mixes - Layer | .71–1.19 |
| Cake Mixes - Angel | 1.78–2.38 |
| Cake Doughnut Mixes | .59–1.19 |
| Cookie Mixes | 0.0–.83 |
| Hush Puppy Mixes | 1.78–2.38 |
| Pancake Mixes | 1.78–2.38 |
| Pizza Mixes | .35–1.43 |
| Refrigerated Doughs | 2.38–2.97* |
| Frozen Pancake Batter | 2.02–2.61* |
| Frozen Biscuit Doughs | 1.78–2.38* |

*% of solids

The moisture content of the fresh doughs of the present invention generally range from about 5% by weight to about 130% by weight, based upon the weight of the powder ingredients. The moisture content will vary, dependent upon the ultimate utility of the dough as to whether it may be employed to prepare cookies, biscuits, cakes, etc.

Baking times of the fresh doughs of this invention are generally within the baking times generally known in the art with respect to the use of previously known leavening systems. It is typical that various mixes of fresh dough will require different baking times considering as well the baking characteristics of the ovens employed. Typical baking times range from 7 to 15 minutes for cookies and longer periods for biscuits and other baked goods.

The doughs of the present invention are formed into pieces in conventional manner, using known bakery equipment such as wire cutting devices, rotary cutters, reciprocating cutters, and the like.

Typically, fresh dough is prepared as in the prior art from flour, shortening, sugar, optionally emulsifiers and preservatives and from about 0.5% by weight to about 3.9% by weight of a leavening system of this invention. Other optional ingredients, of course, can be included as is well known in the art.

In the following examples there appears data with respect to baked goods. The data is in table form and abbreviated for convenience of presentation. Many values reported are somewhat subjective as they are reports of visual inspection of various aspects believed to be important when judging the adequacy of leavening systems. The properties and definition for the abbreviated report in the tables below are as follows:

| CRUMB COLOR | CRUST COLOR |
|---|---|
| W = white | GB = golden brown |
| C = creamy | LGB = light golden brown |
| VC = very creamy | SGB = slightly golden brown |
| SC = slightly creamy | L = light color |
| Y = yellow | W = white |
| VY = very yellow | TEXTURE, |
| TEXTURE, CELL SIZE | CELL WALL THICKNESS |
| N = normal (medium) | M = normal (medium) |
| C = compact | ST = slightly thin |
| VC = very compact | T = thick |
| L = large | VT = very thick |
| TASTE | TENDERNESS |
| TG = tastes good | N = normal |
| Pyro = pyrophosphate taste | STE = slightly tender |
| | STO = slightly tough |
| BL = lack of taste (bland) | TO = tough |

Another important property of the baked goods is its pH. In the following examples the pH reported was determined by grinding the baked sample to a small particle size and slurrying the broken sample in water at twice its weight. The pH of the water was measured with the broken baked goods present. Another measure of quality for baked goods is "lightness" which is the biscuit volume in cc divided by the biscuit weight and reported in the following examples in cc/g units.

The invention is further illustrated by the following preferred embodiments which are not intended to limit the scope of this invention in any way.

DESCRIPTION OF THE PREFERRED EMBODIMENT

Example 1

A comparative set of biscuit dough formulations was prepared wherein sodium bicarbonate is replaced by SACC as the carbonate factor. Several leavening acids were employed in the different formulations. Also, in Batch 7, crystalline calcium carbonate was employed as the carbonate factor. The ingredients were dry-blended with a mechanical mixer for 10 minutes and separately bagged when ready for use. The formulations bagged are described in Table 1 below wherein amounts are shown in gram weight.

TABLE 1

| INGREDIENT | BATCH | | | | | | |
|---|---|---|---|---|---|---|---|
| | 1 | 2 | 3 | 4 | 5 | 6 | 7 |
| Flour | 200 | 200 | 200 | 200 | 200 | 200 | 200 |
| Salt | 3.6 | 3.6 | 3.6 | 3.6 | 3.6 | 3.6 | 3.6 |
| NaHCO$_3$ | 2.9 | 2.9 | 2.9 | | | | |
| SACC | | | | 3.8 | 3.8 | 3.8 | |
| Crystalline CaCO$_3$ | | | | | | | 3.5 |
| Levn-Lite ®[1] | 2.9 | | | 2.9 | | | |
| HT ® Monocalcium phosphate[1] | | 3.6 | | | 3.6 | | 3.6 |
| SAPP-28[2] | | | 3.9 | | | 3.9 | |

[1]Levn-Lite and HT are registered trademarks of Monsanto Company and are commercial leavening agents based upon sodium aluminum phosphate and monocalcium phosphate, respectively.
[2]SAPP-28 is a commercial leavening agent based upon sodium acid pyrophosphate.

When ready for use, 14 g of shortening was cut into 125 g of each dry mix described along with whole milk. The mixture was stirred to an even blend over a period of 45 seconds. After kneading and rolling, the dough from each batch was cut into biscuits and baked for 11 minutes at 475° F. (246° C.). The volume and weight difference for each batch was determined as well as visual appearance, structural properties and taste. The data for each batch appears in Table II below. The amount of milk combined in each batch varied to provide suitable working dough as shown in Table II. Each batch provided 4 biscuits and the data in Table II for weight and volume are the total for all biscuits in each batch. Volume is measured after baking. Baking was performed immediately after mixing and rolling.

TABLE II

| | BATCH | | | | | | |
|---|---|---|---|---|---|---|---|
| | 1 | 2 | 3 | 4 | 5 | 6 | 7 |
| milk (ml) | 88.00 | 88.00 | 89.00 | 89.00 | 89.00 | 89.00 | 88.00 |
| dough wt (g) | 113.35 | 110.92 | 124.81 | 138.29 | 123.01 | 138.9 | 131.57 |
| biscuit wt (g) | 99.77 | 97.99 | 109.87 | 124.18 | 108.79 | 124.80 | 119.22 |
| Volume (cc) | 217.00 | 207.00 | 260.00 | 193.00 | 228.00 | 207.00 | 123.00 |
| crust color | SGB | LGB | GB | L | LGB | L | W |
| specific volume | 1.91 | 1.86 | 2.08 | 1.40 | 1.85 | 1.49 | 0.93 |
| crumb color | C | C | C | VC | SC | SY | gell starch |
| texture, cell size | N | N | N | C | N | C | VC |
| texture, | ST | M | ST | T | M | T | VT |

TABLE II-continued

| | BATCH | | | | | | |
|---|---|---|---|---|---|---|---|
| | 1 | 2 | 3 | 4 | 5 | 6 | 7 |
| cell wall taste | TG | TG | pyro | BL | BL | BL | |
| tenderness | N | N | STE | TO | STO | STO | |
| pH[1] | 6.81 | 6.69 | 7.30 | 6.04 | 6.29 | 7.19 | 4.95 |

[1] one biscuit.

As shown by the data in Table II crystalline calcium carbonate gave unsatisfactory results. SACC provided satisfactory results as the carbonate factor in the leavening system comparable to sodium bicarbonate.

Example 2

A bake-off was performed by preblending eight formulations which varied in carbonate factor and leavening acid. The formulations tested are described in Table III below

TABLE III

| Ingredient (g) | 1 | 2 | 3 | 4 | 5 | 6 | 7 | 8 |
|---|---|---|---|---|---|---|---|---|
| Flour | 200 | 200 | 200 | 200 | 200 | 200 | 200 | 200 |
| Salt | 3.6 | 3.6 | 3.6 | 3.6 | 3.6 | 3.6 | 3.6 | 3.6 |
| Na bicarb | 2.9 | 2.9 | — | — | — | — | — | — |
| k bicarb | — | — | 3.4 | 3.4 | — | — | — | — |
| SACC | — | — | — | — | 3.8 | 3.8 | — | — |
| xtal CaCO$_3$ | — | — | — | — | — | — | 9.6 | 9.6 |
| MCP | 3.6 | — | 3.6 | — | 3.6 | — | 3.6 | — |
| Levn-Lite ® | — | 2.9 | — | 2.9 | — | 2.9 | — | 2.9 |

The dry mixes were blended for 10 minutes and baked for 1 day. After the holding period the mixes were employed to make biscuit dough by cutting in shortening at a ratio of 125 g of mix to 14 g of shortening and mixing an appropriate quantity of milk as shown in Table IV below. The procedure of Example 1 was followed except the bake time was 13 minutes. The results are shown in Table IV below.

TABLE IV

| | BATCH | | | | | | | |
|---|---|---|---|---|---|---|---|---|
| | 1 | 2 | 3 | 4 | 5 | 6 | 7 | 8 |
| milk (ml) | 80.00 | 83.00 | 82.00 | 82.00 | 82.00 | 82.00 | 82.00 | 82.00 |
| Dough wt(g) | 118.76 | 129.32 | 110.78 | 120.46 | 117.83 | 125.14 | 128.62 | 126.45 |
| Biscuit wt(g) | 101.42 | 110.93 | 95.22 | 102.92 | 100.00 | 107.41 | 112.40 | 110.80 |
| volume (cc) | 214.00 | 254.00 | 197.00 | 240.00 | 213.00 | 182.00 | 139.00 | 139.00 |
| spec. vol (cc/g) | 1.72 | 1.96 | 1.78 | 1.99 | 1.81 | 1.45 | 1.08 | 1.10 |
| lightness | 2.01 | 2.29 | 2.07 | 2.33 | 2.13 | 1.69 | 1.26 | 1.25 |
| pH | 6.61 | 6.70 | 6.63 | 6.77 | 6.18 | 5.84 | 5.85 | 5.83 |

The fresh doughs of the present invention can optionally include many substances known in the art to be added to fresh dough including bulking agents such as dietary fiber and hydrocolloides, corn fiber, soy filtrate, wheat bran, and apple tomace fiber (dehydrated and freeze dried) as exemplary of dietary fibers. Suitable amounts of such dietary fibers range up to about 10% by weight based upon the weight of the dough. The preferred dietary fiber is wheat bran. Also, humectant gels can also be employed to provide moisture in the final baked good.

Texturizing and flavoring ingredients conventionally used in the production of baked goods may be employed in the novel doughs of this invention. The amounts employed are generally comparable to those used in the conventional formulation so as to achieve satisfactory mouthfeel, texture and taste. Typical amounts of conventional texturizing and flavoring ingredients used in the production of baked goods are in the range of from about 5% by weight up to about 25% by weight of the fresh dough. Other additives such as sweeteners, etc. can also be employed in combination with the novel leavening system of this invention.

What is claimed is:

1. A method for leavening a fresh dough product which comprises mixing with flour, water and shortening a leavening system comprising stabilized, x-ray amorphous calcium carbonate as the carbonate factor and a leavening acid.

2. A method of claim 1 wherein the leavening acid is selected from the group consisting of sodium acid pyrophosphate, diammonium hydrogen phosphate, monocalcium phosphate, aluminum phosphate dicalcium phosphate, sodium aluminum phosphate, citric acid and mixtures thereof.

3. A method of claim 2 wherein the leavening acid is a mixture of sodium aluminum phosphate and sodium aluminum sulphate anhydrous.

4. A method of claim 2 wherein the leavening acid is a mixture of sodium aluminum phosphate with anhydrous monocalcium phosphate.

5. A method of claim 1 wherein the leavening acid is encapsulated so as to delay its leavening action.

6. A fresh dough product comprising a mixture of flour, water, shortening, and a sodium-free leavening system comprising stabilized, x-ray amorphous calcium carbonate and a leavening acid free of sodium.

7. A fresh sodium product of claim 6 wherein the leavening acid is dicalcium phosphate.

8. A fresh dough product of claim 6 wherein the leavening acid is monocalcium phosphate.

9. A fresh dough product of claim 6 wherein the leavening acid is selected from the group consisting of citric acid, fumaric acid and potassium tartrate.

* * * * *